Dec. 11, 1962  A. L. LEE  3,067,830
MINE HAULAGE VEHICLE
Filed Dec. 22, 1958  2 Sheets-Sheet 1
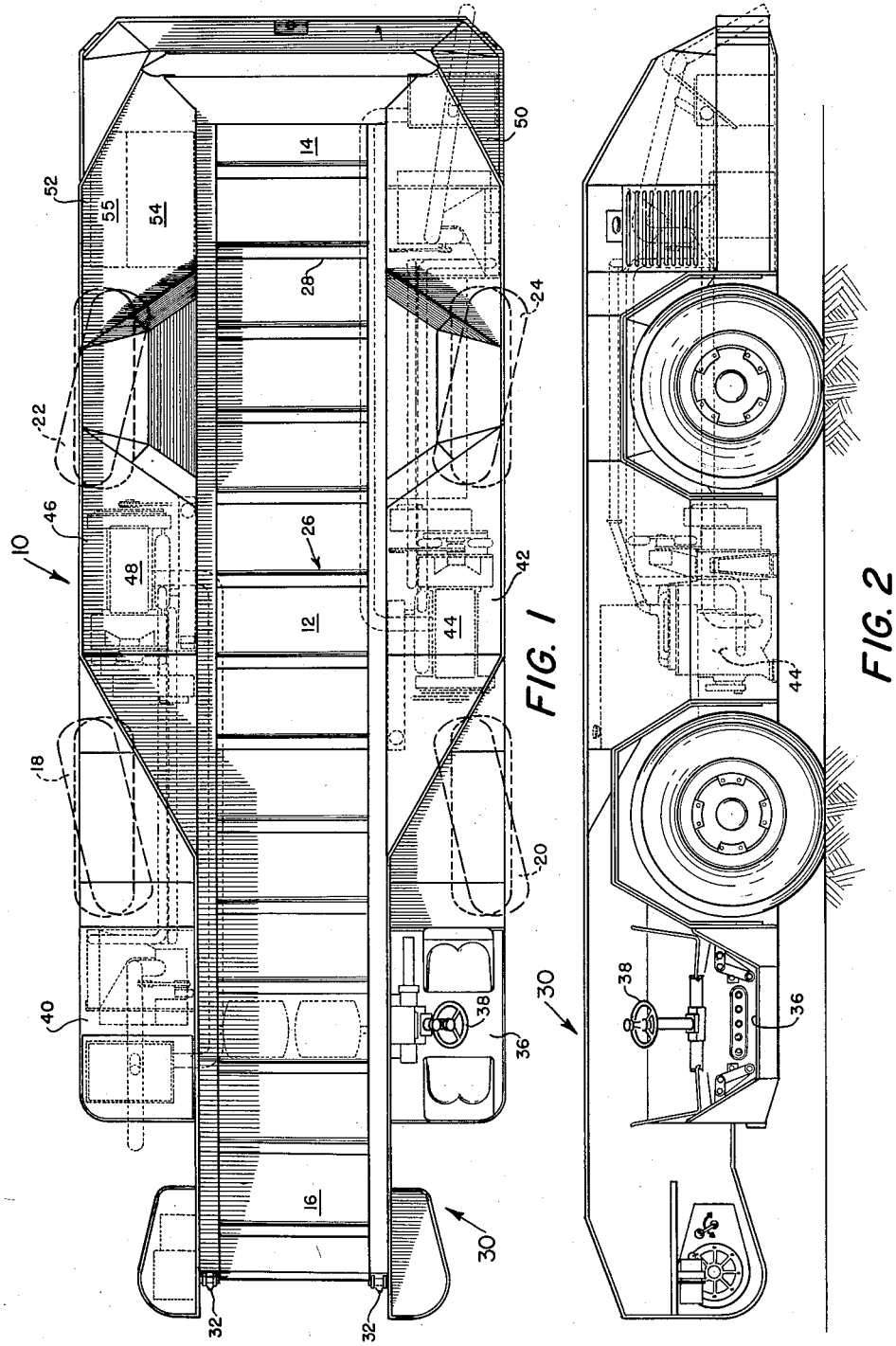

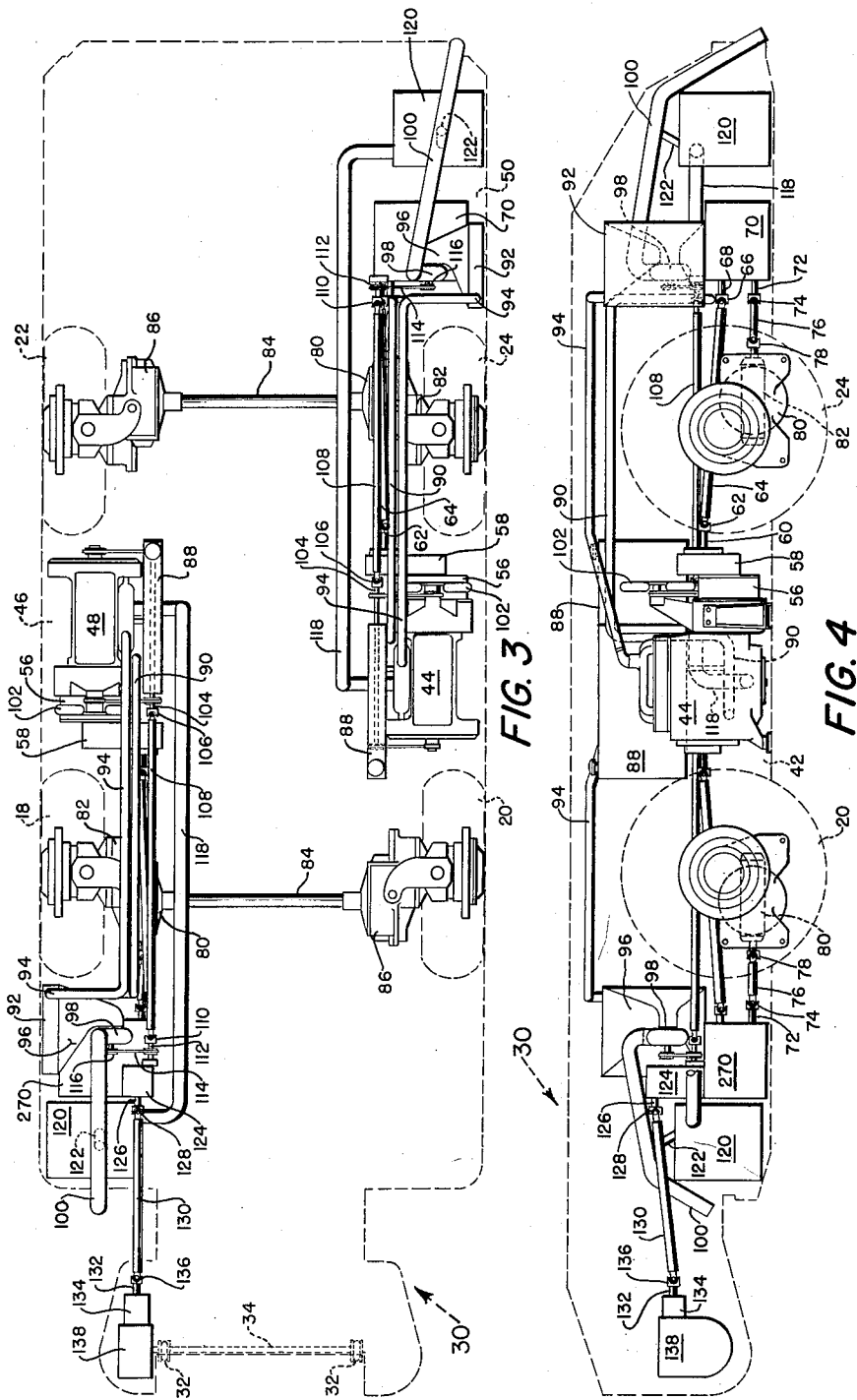

United States Patent Office 3,067,830
Patented Dec. 11, 1962

3,067,830
MINE HAULAGE VEHICLE
Arthur L. Lee, Columbus, Ohio, assignor to Consolidation Coal Company, Pittsburgh, Pa., a corporation of Pennsylvania
Filed Dec. 22, 1958, Ser. No. 782,254
2 Claims. (Cl. 180—45)

This invention relates to a mine haulage vehicle and more particularly to a mine haulage vehicle propelled by a plurality of prime movers.

This invention is an improvement over the mine haulage vehicle illustrated and described in U.S. Patent #2,754,015 issued to Arthur L. Lee and assigned to the same assignee.

The haulage vehicle described in the above named patent has proven very successful in conventional mine haulage operations. The vehicle, because of its rugged construction and superior operating characteristics, has opened new fields to shuttle type haulage vehicles. For example, shuttle vehicles of the type described in the above named patent are now used in what may be termed ore mines as distinguished from coal mines. The ore of these mines is much heavier per equivalent volume than coal. To haul an equivalent volume of the ore, the power requirements of the vehicle are proportionately increased. Further, in certain of these mining operations relatively steep grades are experienced. Conveying or hauling material up these steep grades again increases the power requirements of the vehicle.

Athough, of necessity, the power requirements of the vehicle must be increased, the overall vehicle dimensions, especially the length and width of the vehicle, must remain substantially the same. These dimensions are restricted by both the size of the haulageways and the radius of the curves in the haulageways.

Accordingly, the principal object of this invention is to provide a mine haulage vehicle capable of carrying large volumes of heavy material in relatively narrow haulageways.

Another object of this invention is to provide a haulage vehicle that is propelled by a plurality of internal combustion engines.

A further object of this invention is to provide a haulage vehicle having an improved cooling system for the internal combustion engines and an improved dispersion means for the exhaust gases of the internal combustion engines.

The invention consists in the improved construction and cooperative relation of parts to be more fully described hereinafter and the novelty of which will be particularly pointed out and distinctly claimed.

In the accompanying drawings to be taken as part of the specification there is fully and clearly illustrated a preferred embodiment of my invention in which drawings:

FIGURE 1 is a top plan view of a mine haulage vehicle.

FIGURE 2 is a view in side elevation of the haulage vehicle illustrated in FIGURE 1.

FIGURE 3 is a schematic view of the vehicle in plan illustrating portions of the driving means, engine cooling means and engine exhaust conditioning means.

FIGURE 4 is a view in side elevation similar to FIGURE 3.

Referring to the drawings and particularly to FIGURES 1 and 2 the mine haulage vehicle has a body portion 10 with a material receiving compartment 12 extending lengthwise thereof and a material receiving end portion 14 and a material discharge end portion 16. The body portion 10 is mounted on a pair of front traction wheels 18 and 20 and a pair of rear traction wheels 22 and 24. The wheels 18–24 are mounted along the sides of the body 10 with the haulage compartment 12 extending therebetween. The haulage compartment 12 has a conventional endless flight conveyor 26 extending along its bottom portion. The conveyor 26 includes a plurality of cross flights 28 that are propelled by suitable side chains (not shown). The discharge end of the conveyor 26 extends along a tiltable end frame 30 which is pivotally arranged to effect variations in the discharge height of the vehicle discharge end portion 16. The endless conveyor 26 is propelled by a pair of sprockets 32 secured to a cross shaft 34 (FIG. 3) which is propelled by one of the prime movers and will be later described.

The haulage vehicle has, adjacent the discharge end 16 and at one side of the material receiving compartment 12, a compartment 36 which provides a station for the operator and which has therein a suitable steering wheel 38 and other necessary controls by which the vehicle may be operated and steered. On the other side of the haulage compartment 12 there is another compartment 40 in which a portion of the propelling means is positioned. The haulage vehicle has, on the same side as the operator's compartment 36, intermediate the wheels 20 and 24, another compartment 42 in which the prime mover 44 is positioned. On the opposite side of the haulage vehicle, between wheels 18 and 20, there is another compartment 46 in which a second prime mover 48 is positioned.

Adjacent the material receiving portion of the vehicle and on the same side as the operators compartment 36 there is another compartment 50 in which a portion of the propelling means associated with internal combustion engine 44 is found. Opposite the compartment 50 on the other side of the material haulage compartment 12 there is another compartment 52 in which there is positioned a fuel tank 54 and control apparatus 55.

As illustrated in FIGURES 3 and 4, the prime mover 44, which is preferably a diesel type of internal combustion engine, is mounted in compartment 42 between the propelling wheels 20 and 24. The output shaft (not shown) of the internal combustion engine is connected to a torque converter 56 which in turn is connected to a reduction type motor transmission 58 that has suitable reduction gearing. The transmission 58 has an output shaft 60 extending rearwardly therefrom toward the material receiving end of the vehicle body portion 10. The output shaft 60 is connected by universal shafting 62 to a shaft 64. The shaft 64 extends rearwardly past the wheel 24 and is connected by universal shafting 66 to an input shaft 68 of a main transmission 70. The transmission 70 provides a plurality of speeds in both the forward and reverse directions. The transmission 70 has an output shaft 72 that is connected by universal shafting 74 to a shaft 76 which extends toward the wheel 24 and is connected by universal shafting 78 to a differential 80. The differential 80 is arranged to drive wheel 24 through a gearing arrangement within housing 82 and also to drive wheel 22 by means of cross shaft 84 connected to gearing within gear housing 86. It should be noted that wheels 22 and 24 are both driven by prime mover 44 and are pivotally secured to the body 10 so that they both may be simultaneously steered. See outline of wheels 18–24 shown in dotted line in FIGURE 1.

The internal combustion engine 44 has a liquid cooling system which includes a makeup water tank 88 positioned in compartment 42 between the material haulage compartment 12 and the engine 44. The makeup water tank 88 is suitably connected to the internal combustion engine 44 to maintain an adequate supply of water within the cooling system. The internal combustion engine 44 has a suitable liquid pump accessory which provides a means for pumping liquid from the cooling jacket portion of the internal combustion engine 44 through the conduit 90 to the radiator 92 positioned in compartment 50. A second conduit 94 returns the cooled liquid from the radiator 92 to the cooling jacket of the internal combustion engine 44. The radiator 92 is positioned vertically in the compartment 50 adjacent the side edge of the body 10 and has its rear portion enclosed by a housing 96 which forms the air intake portion of blower 98. With this arrangement as the blower 98 is energized air is pulled in around the core of the radiator 92 and is discharged from the blower through conduit 100.

The internal combustion engine 44 has as a portion of its accessory section an engine driven fan 102. The fan 102 moves air around the housing of the engine 44 to provide for additional cooling thereof. Extending from the accessory section of the engine 44 there is a belt driven shaft 104 which is connected by universal shafting 106 to a shaft 108. The shaft 108 is, in turn, connected through another universal shafting 110 to the shaft of a sheave 112. Sheave 112 is connected by means of a flexible belt 114 to the drive sheave 116 of blower 98. With this arrangement the blower 98 is driven by the internal combustion engine 44 and provides for forced air cooling of the liquid within radiator 92. This arrangement minimizes the possibility of overheating the cooling system due to the vehicle traveling at low rates of speed and insufficient air being supplied for cooling purposes.

The exhaust gases leave the internal combustion engine 44 through conduit 118 which extends rearwardly toward the material receiving end portion 14. Positioned in the compartment 50 there is an exhaust gas conditioner 120 which scrubs the exhaust gases and removes the poisonous gases therefrom. The conditioned exhaust gases leave the conditioner 120 through the conduit 122 which intersects conduit 100. With this arrangement the conditioned exhaust gases leaving conditioner 120 are mixed with and diluted by the radiator cooling air discharged by blower 98. The exhaust gases, although conditioned by means of conditioner 120, are thus diluted by the cooling air so that the concentration of the exhaust gases adjacent the vehicle is reduced.

On the opposite side of the vehicle 10 in compartment 46 there is positioned a second prime mover 48 which is arranged to propel wheels 18 and 20 in a manner similar to the propulsion of wheels 22 and 24 by prime mover 44. The prime mover 48 is substantially similar to prime mover 44 and includes similar accessory section, transmission, cooling system, and exhaust system. The arrangement of the prime mover 48 and its accessories is sufficiently identical with that of prime mover 44 that all corresponding parts are given the same reference characters.

The main transmission 70 driven by prime mover 48 has a conveyor transmission 124 connected thereto and driven thereby. The conveyor transmission has an output shaft 126 which is connected by means of universal shafting 128 to a shaft 130 which extends forwardly along the side of the boom 30 and is connected to the input shaft 132 of a conveyor reversing mechanism 134 by means of universal shafting 136. The conveyor mechanism 134 is in turn connected to a suitable worm drive 138 which in turn drives the conveyor cross shaft 34 and the sprockets 32.

With this arrangement internal combustion engine 44, through the various shafting, drives propelling wheels 22 and 24 and prime mover 48 drives propelling wheels 18 and 20. All of the wheels 18–24 are driven and steerable. Suitable control mechanisms may be provided to synchronize prime movers 44 and 48 so that equal power is being transmitted to all of the wheels.

I have, therefore, provided a vehicle which includes the improved features of the vehicle described in Patent #2,754,015 and further provides for additional power required in hauling greater pay loads on steep grades. The additional prime movers and necessary accessories have been positioned within a vehicle body having substantially the same dimensions. Further, I have provided a means for cooling the internal combustion engines and a means for diluting the exhaust gases with the air employed to cool the engine cooling liquid.

According to the provisions of the patent statues, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A mine haulage vehicle having forward and rear end portions comprising a mobile body having first and second sides and a material receiving compartment extending lengthwise between said sides, front and rear pairs of supporting wheels for said body, a first liquid cooled internal combustion engine arranged at the first side of said body between said front and rear pairs of supporting wheels, a first selective multispeed forward and reverse transmission arranged on said body at said first side between said vehicle rear end portion and the adjacent rear supporting wheel, a first radiator arranged on said body at said first side between said vehicle rear end portion and said adjacent rear supporting wheel, first conduit means connecting said first internal combustion engine and said first radiator to provide circulation of liquid between said first internal combustion engine and said first radiator, first blower means positioned adjacent said first radiator at the first side of said body, said first blower means constructed and arranged to circulate air through said first radiator, means to drive said first blower means, first driving connections between said first internal combustion engine and said first multispeed forward and reverse transmission, second driving connections between said first transmission and said adjacent rear wheel, and third driving connections between said adjacent rear wheel and the other rear wheel, a second liquid cooled internal combustion engine arranged at the second side of said body between said front and rear pairs of supporting wheels, a second selective multispeed forward and reverse transmission arranged on said body at said second side between said vehicle front end portion and the adjacent front supporting wheel, a second radiator arranged on said body at said second side between said vehicle front end portion and said adjacent front supporting wheel, second conduit means connecting said second internal combustion engine and said second radiator to provide circulation of liquid between said second internal combustion engine and said second radiator, second blower means positioned adjacent said second radiator at the second side of said body, said second blower means constructed and arranged to circulate air through said second radiator, means to drive said second blower means, fourth driving connections between said second internal combustion engine and said second multispeed forward and reverse transmission, fifth driving connections between said second transmission and said adjacent front wheel, and sixth driving connections between said adjacent front wheel and the other front wheel, said first and second radiators and said first and second blower means positioned at diagonally opposite portions of said vehicle body such that there is a minimum of heat exhaust from one of said radiators blown to the intake portion of the other of said radiators.

2. A mine haulage vehicle having forward and rear end portions comprising a mobile body having first and second sides and a material receiving compartment extending lengthwise between said sides, front and rear pairs of supporting wheels for said body, a first liquid cooled internal combustion engine arranged at the first side of said body between said front and rear pairs of supporting wheels, a first selective multispeed forward and reverse transmission arranged on said body at said first side between said vehicle rear end portion and the adjacent rear supporting wheel, a first radiator arranged on said body at said first side between said vehicle rear end portion and the adjacent rear supporting wheel, first conduit means connecting said first internal combustion engine and said first radiator to provide circulation of liquid between said first internal combustion engine and said first radiator, first blower means positioned adjacent said first radiator at the first side of said body, said first blower means constructed and arranged to circulate air through said first radiator, means to drive said first blower means, a first exhaust gas conditioner having an inlet and an outlet arranged on the first side of said body adjacent said first blower means, first exhaust conduit means connecting the exhaust of said first internal combustion engine to said first exhaust conditioner inlet, said first exhaust conduit means arranged to convey exhaust gases from said first internal combustion engine to said first exhaust conditioner, said first blower means arranged to discharge air circulated through said first radiator adjacent said first exhaust conditioner outlet to thereby dilute said conditioned exhaust gases, first driving connections between said first internal combustion engine and said first multispeed forward and reverse transmission, second driving connections between said first transmission and said adjacent rear wheel, and third driving connections between said adjacent rear wheel and the other rear wheel, a second liquid cooled internal combustion engine arranged at the second side of said body between said front and rear pairs of supporting wheels, a second selective multispeed forward and reverse transmission arranged on said body at said second side between said vehicle front end portion and the adjacent front supporting wheel, a second radiator arranged on said body at said second side between said vehicle front end portion and the adjacent front supporting wheel, second conduit means connecting said second internal combustion engine and said second radiator to provide circulation of liquid between said second internal combustion engine and said second radiator, second blower means positioned adjacent said second radiator at the second side of said body, said second blower means constructed and arranged to circulate air through said second radiator, means to drive said second blower means, a second exhaust gas conditioner having an inlet and an outlet arranged on the second side of said body adjacent said second blower means, second exhaust conduit means connecting the exhaust of said second internal combustion engine to said second exhaust conditioner inlet, said second exhaust conduit means arranged to convey exhaust gases from said second internal combustion engine to said second exhaust conditioner, said second blower means arranged to discharge air circulated through said second radiator adjacent said second exhaust conditioner outlet to thereby dilute said conditioned exhaust gases, fourth driving connections between said second internal combustion engine and said second multispeed forward and reverse transmission, fifth other driving connections between said second transmission and said adjacent front wheel, and sixth driving connections between said adjacent front wheel and the other front wheel, said first and second radiators, said first and second blower means, and said first and second exhaust conditioners positioned at diagonally opposite portions of said vehicle body such that there is a minimum of radiator heat exhaust and diluted engine exhaust gases from one of said radiators and adjacent exhaust conditioners blown to the intake portion of the other of said radiators.

References Cited in the file of this patent

UNITED STATES PATENTS

| | | |
|---|---|---|
| 1,863,972 | Eckland et al. | June 21, 1932 |
| 1,934,385 | Strauss | Nov. 7, 1933 |
| 2,197,854 | Eckert | Apr. 23, 1940 |
| 2,199,517 | Best | May 7, 1940 |
| 2,378,892 | Arentzen | June 26, 1945 |
| 2,599,061 | Lee | June 3, 1952 |
| 2,602,518 | Beck | July 8, 1952 |
| 2,754,015 | Lee | July 10, 1956 |